United States Patent [19]

Ruggieri, Jr.

[11] 4,023,306

[45] May 17, 1977

[54] COLLAPSIBLE WINDOW GREENHOUSE

[76] Inventor: Nicola Ruggieri, Jr., 44 Rhode Island St., Cranston, R.I. 02920

[22] Filed: June 14, 1976

[21] Appl. No.: 695,947

[52] U.S. Cl. ............................. 47/40; 52/36; 52/37; 52/63

[51] Int. Cl.² .................. A01G 9/00; A01G 9/02

[58] Field of Search ............... 52/36, 37, 63; 47/17, 47/40, 68

[56] References Cited

UNITED STATES PATENTS

| | | | |
|---|---|---|---|
| 1,087,490 | 2/1914 | Henry | 52/63 |
| 1,380,237 | 5/1921 | Neff | 47/40 X |
| 1,511,260 | 10/1924 | Brousseau | 52/37 |
| 1,946,567 | 2/1934 | Braunworth | 52/63 X |
| 3,148,479 | 9/1964 | D'Amato | 52/63 X |
| 3,698,143 | 10/1972 | Francis | 47/68 |
| 3,812,616 | 5/1974 | Koziol | 47/17 |
| 3,946,522 | 3/1976 | Schifman | 47/40 X |

*Primary Examiner*—Alfred C. Perham
*Attorney, Agent, or Firm*—Salter & Michaelson

[57] ABSTRACT

A collapsible, portable greenhouse which is adapted to interfit within the opening of a standard window. The greenhouse is in the form of an enclosure having a front frame member adapted to interfit with the frame defining the window opening and a pair of opposed support members adapted to outwardly project therefrom and in turn support a flexible cover member of at least translucent material which in turn is connected to the peripheral portions of the front frame member so as to project from and enclose growing space to the rear of such frame member.

13 Claims, 6 Drawing Figures

U.S. Patent  May 17, 1977  Sheet 1 of 2  4,023,306
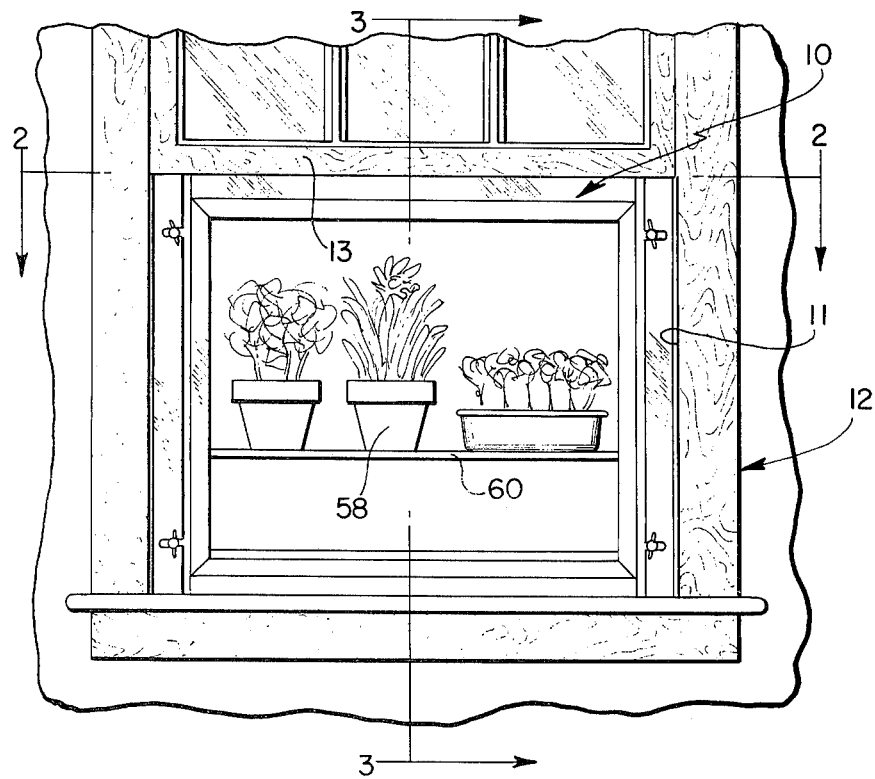
FIG. 1
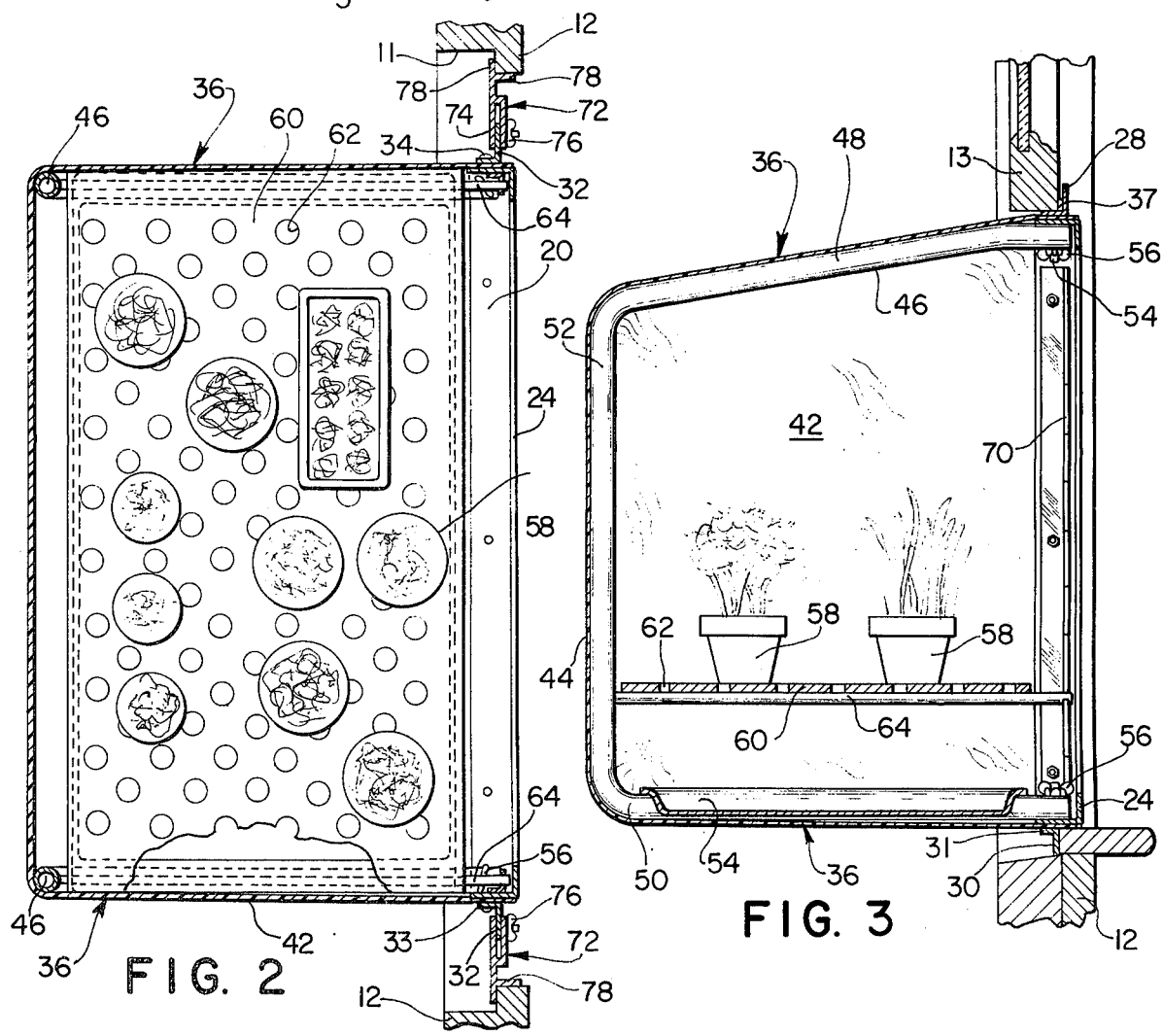
FIG. 2
FIG. 3

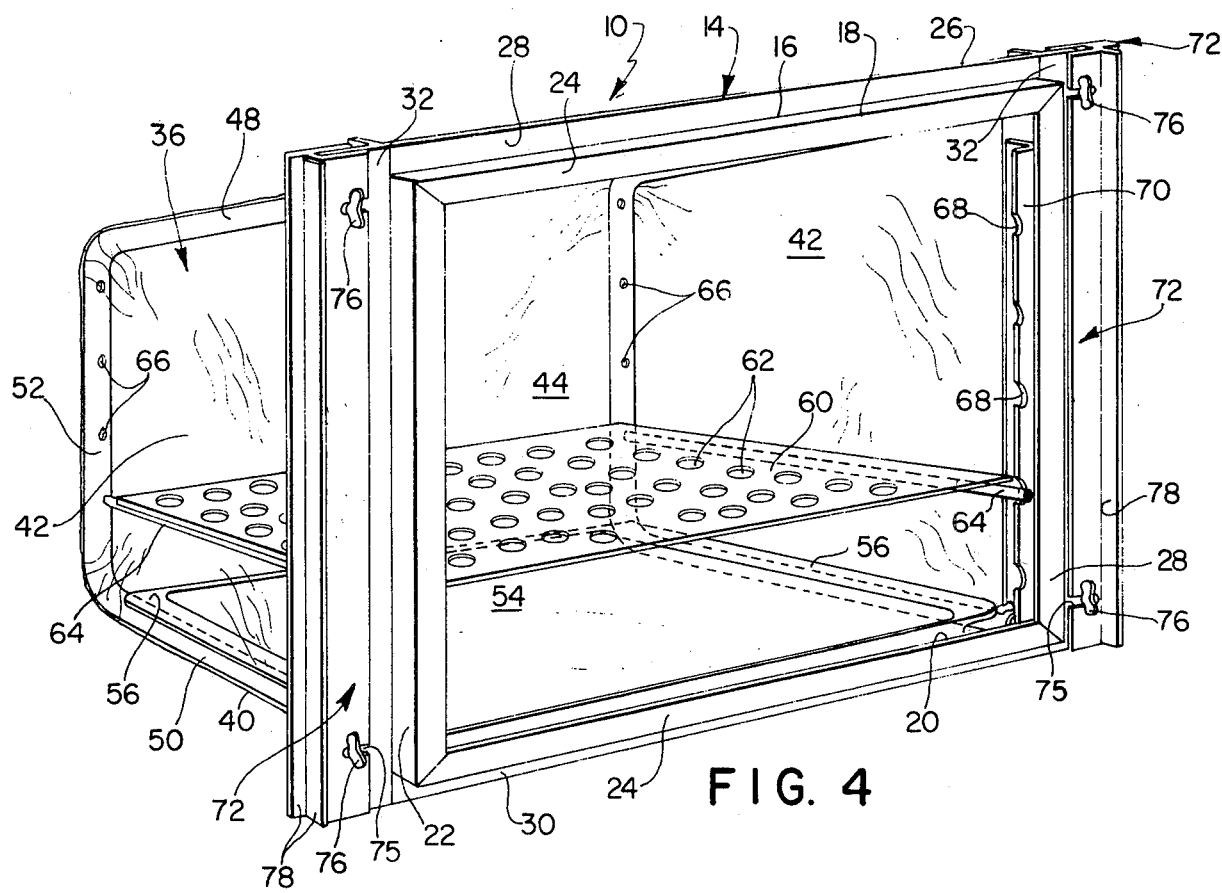

COLLAPSIBLE WINDOW GREENHOUSE

BACKGROUND OF THE INVENTION

With the reoccurence of gardening popularity, both vegetable and ornamental, it is increasingly common to start plants from seed and to nurture such seedlings in a cold-frame or greenhouse structure of one type or another. Cold frames, however, generally require heating cables in cold climates and entail at least some degree of outdoor attention and may otherwise not be convenient for those living in the city or participating in community gardens. On the other hand, greenhouse structures are generally quite expensive and can require extensive or undesirable architectural change to one's house or apartment. Also, both aforementioned type structures are generally permanent in nature and hence do not lend themselves to convenient disassembly or portability.

Accordingly, an object of the present invention is the provision of a completely portable cold-frame or greenhouse structure which is adapted to interfit into an opening, such as provided by a window frame and the like, and which is completely collapsible and easily removable therefrom for nonuse storage.

Another object of the present invention is the provision of a collapsible enclosure adapted for positioning in a window opening or the like for use as a cold frame or greenhouse including a skeletal frame which projects outside the window and is enclosed by a flexible cover open at its inner or window side so that the enclosure may be heated by the room into which such opening faces, thus eliminating the need for heating cables and the like.

Another object of the present invention is the provision of a completely collapsible window greenhouse-type enclosure wherein the collapsed configuration thereof is generally of a narrow, single-planar configuration which is easy to store when not in use.

Still another object of the present invention is the provision of a collapsible window greenhouse enclosure wherein the flexible material forming a cover thereof includes a top portion which is downwardly and outwardly slanted so that water is quickly shed therefrom.

A still further object of the invention is the provision of a window-type greenhouse enclosure wherein a bottom tray portion thereof serves to maintain a pair of pivotally movable cover support members in a fixed open position.

Another object is the provision within an enclosure of the above type of a supporting shelf for plants and the like which is adjustable to varying height positions therein.

These and other objects of the present invention are accomplished by the provision of an enclosure including a skeletal frame over which a transparent or translucent cover is adapted to fit, said frame comprising a relatively open front member having a marginal dimension corresponding to the opening into which such enclosure is adapted to fit and a pair of support members pivotally mounted thereto for support and stretching of a cover formed of generally flexible transparent or translucent material. The cover is attached to said front frame member whereby both the supports and the cover may be collapsed into the confines of the front frame member to provide a compact, relatively flat assembly to facilitate portability or storage of the unit when not in use.

Other objects, features and advantages of the invention will become apparent when the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a front elevational view of the greenhouse enclosure of the present invention mounted within the opening of a window;

FIG. 2 is a top sectional view thereof taken along line 2—2 of FIG. 1;

FIG. 3 is a side sectional view thereof taken along line 3—3 of FIG. 1;

FIG. 4 is a front perspective view;

FIG. 5 is a top plan view showing the enclosure expanded into operative condition; and FIG. 6 is a top plan view enclosure thereof in a collapsed or storage position with phantom line representation showing the support members and cover portions thereof in their previously open operative position.

DESCRIPTION OF THE INVENTION

Turning now to the drawings, the enclosure 10 of the present invention is adapted for use as a greenhouse or cold frame adapted to fit in the opening 11 of a standard window frame 12 and held therein by the partially open lower sash 13 thereof, as depicted in FIGS. 1 and 3. The enclosure 10 includes a skeletal frame 14 in turn comprising a relatively rigid open front frame member 16 of generally rectangular configuration and having opposed top and bottom sections 18 and 20, respectively, and opposed side sections 22. The front frame member 16 may be formed from separate sections of any suitable material, such as extruded thinwalled metal stock connected at its corner portions by any suitable means, or it may be formed from a single length of material which is appropriately bent into the shape depicted. An inwardly projecting ledge 24 is provided around the inner margins of the frame 16 so as to cover from both view and physical exposure to the user's hands the various connecting and supporting portions of the enclosure, which will hereinafter be described. Such ledge or inwardly projecting flange 24 may also be formed of sheet metal and preferably extends integrally from the stock from which the frame 16 is formed. In addition to providing visual and physical protection for the user, the bottom horizontal portion of the ledge 24, and in those cases wherein the cover is not downwardly sloped, the top horizontal portion of the ledge as well, serve to limit the pivotal movement of cover support members connected thereto, when the latter are collapsed, to positions within the plane of the frame 16 as also will hereinafter be more evident.

An outer marginal flange 26 is in turn provided about the outside extent of the frame 16 and includes individual top, bottom and side sections 28, 30 and 32, respectively, each of which may be of L-shaped configuration having respective base extensions 29, 31 and 33. These extensions 29, 31, and 33 rest against respective marginal portions of the open frame member 16 and by means of suitable fastening means, such as the headed bolts shown at 34, serve to fasten the ledge or flange 24 to the front frame 16. It is between this external marginal flange 24 and the underlying portions of the front member 16 that the inner marginal edge of the cover 36 is clamped for securement to the frame member 16. In addition, a seal 37 in the form of a flexible strip or bead of putty or the like may be positioned along the top surface of extension 29 of the section 28 to cushion the sash 13 engaged therewith and to assume leakproof retention of the enclosure 10 within the frame 12.

The cover 36 is of flexible material, such as resinous plastic compositions including polyethylene, polypropylene and polyvinylchloride, in order to be transparent or at least translucent to the extent that the sun's rays may pass therethrough and serve to at least in part heat and otherwise aid in the growth of the plants placed in the enclosure. As depicted, the cover 36 includes a top panel 38, a bottom panel 40, opposed side panels 42 and an end panel 44. It should be apparent that when not in use, the cover is free to be folded or otherwise compressed into the space defined by the front frame member 16 so as to reduce the volume of the enclosure for storage.

The enclosure further includes a pair of support members 46 of generally U-shaped configuration which may, as depicted, be formed from an appropriately bent single piece of hollow aluminum tubing or the like. Thus shaped, each support member 46 includes top, bottom and connecting end portions 48, 50 and 52, respectively. The top 48 and bottom support portions 50 include terminal ends thereof, each having an opening for receipt of a threaded pivot pin 54 passing in turn through openings (not shown) in the underlying portions of the top and bottom sections 18, 20 of the front frame member 16 and connected thereto by means of fastening means, such as the thumb screws 56 depicted. In this manner then, the support members 46 are pivotally attached to the frame 16 and may thus move from a closed position within the confines thereof, as shown in full lines in FIG. 6, to an open or expanded position wherein the supports 46 are disposed generally normal to the plane of the frame 16, or, expressed differently, extend rearwardly therefrom, as shown in FIG. 5. In such expanded position, the support members 46 are adapted to contact the end portions of the side wall panels 42 of the cover 36 and thus retain the cover in a generally stretched, taut, or otherwise extended position. It should also be noted that the top portions 48 of the supports 46 preferably slant downwardly and rearwardly from their upper connections with the frame member 16 so that the top panel 38 of cover 36, when the latter is stretched taut, will likewise slant downwardly and rearwardly to allow rain or other precipitation falling upon the cover 36 to more easily and quickly run off therefrom.

In order to maintain the supports 46 and accordingly the entire enclosure 10 in an open, expanded, use position, a rigid tray 52 intended for disposition at the bottom of the enclosure 10 is provided. Such tray 52 includes an imperforate bottom wall 54 and upwardly orientated, opposed hook-shaped side extensions 56 which in turn are adapted to supportively rest upon the top surfaces of the bottom portions 50 of the supports 46. Extensions 56 are generally of a downwardly orientated, U-shaped, rounded configuration so as to better receive the rounded configuration of the supports 46. The bottom shelf 52 may be quickly placed in position when the enclosure 10 is in expanded operative position and may be just as easily removed when it is desired to collapse the enclosure. Also, the imperforate nature of the bottom wall 54 thereof provides a collector for moisture, water, dirt or other foreign matter that may become dislodged from the plants within enclosure 10, the ready removal of said tray facilitating cleaning thereof. Without tray 52, such foreign matter could collect on the bottom panel 40 of the cover 36, thus undesirably stretching the cover and/or enabling such water or other material to seep into the window sill or otherwise harmfully contact other surfaces within the living areas of the user's house or apartment.

It should also be pointed out that seedling or plant containers 58 may be placed directly upon the bottom wall 54 of the bottom tray 52. However, it is preferable and desirable to provide a shelf 60 which is adjustable at varying heights in relationship to the enclosure. It is also preferred that the shelf 60 include a plurality of openings 62, i.e., that the shelf 60 is of a foraminous nature so that moisture or other material as above discussed may be free to fall therethrough to the bottom tray 52 for ease in cleaning, for better heat distribution, and in the event that more than one layer of plants is utilized, so that sunlight reaches all portions of the enclosure. Such shelf 60 is supported by a pair of opposed rods 64 mounted on either side of the frame 16. The positioning of the rods in the rear of the enclosure is facilitated by a plurality of spaced openings 66 within the connecting end portions 52 of the supports 46 and into which one end of the rods 64 is adapted to project. The other ends of the rods 64 are adapted to rest within notches 68 provided at spaced intervals within an L-shaped bracket 70 secured to each inner portion of the side sections 22 of the frame 16 which may be accomplished by the same means (i.e., threaded bolts) used to secure the outer marginal flange 26 thereto. As previously explained, the inner marginal flange 24 serves to prevent contact by the hand of the user with such brackets 70 as well as the various components providing the pivotal connection between the supports 46 and the frame 16. Furthermore, the inner flange 24 provides a front stop for the top and bottom portions 48 and 50 of the supports 46 so as to limit the forward inward movement thereof when in collapsed or storage position. It should also be pointed out that bottom portions 50 of the supports 46 are adapted to rest on the bottom wall 20 when the supports have been swung to collapsed, inoperative position, thus strengthening the collapsed assembly. It should be noted, however, that in those cases where the preferred configuration of the top portions 48 of the supports 46 are downwardly and rearwardly orientated so as to provide for water runoff from the cover 36, the supports 46 do not engage the upper wall 18 of the frame 16 when collapsed.

It should be apparent that the greenhouse enclosure 10 of the present invention accomplishes the objects sought by the provision of structure which is both easy to operate and which may be manufactured for a relatively low cost. The placement of the enclosure 10 within the opening 11 of a standard window frame 12 is facilitated by outwardly slidable side panels or expanders 72 comprising a generally U-shaped member 74 adapted to interfit over the marginal side wall extensions 32 and outwardly slide in relationship thereto by means of slots 75 and secured in such varying positions therewith by the fastening means 76 depicted. The opposite ends of said U-shaped member 74 are provided with a bifurcated terminal portion 78 of L-shaped configuration so as to receive the corner of the window frame 12 as shown most clearly in FIG. 2. It will be understood that the expanders 72 are adjusted so as to bridge the space between the sides of enclosure 10 and the adjacent sides of window frame 12, whereby when properly mounted, and with window sash 13 making sealing engagement with bead 37, a relatively airtight installation exists, it being obviously desirable to minimize the entry of outside air as much as possible.

It should be further understood that variations and modifications and special adaptions of the embodiments of the present invention may be utilized without departing from the scope of the present invention as set forth in the following claims.

What is claimed is:

1. A collapsible enclosure adapted for positioning in a window opening or the like for use as a greenhouse and including a skeletal frame over which a cover is adapted to fit, said frame comprising a relatively rigid open front member having marginal dimensions corresponding to the opening into which such enclosure is adapted to fit and a pair of opposed support members each mounted to a respective side of said front member for pivotal movement therewith from a closed storage position wherein said supports are generally interfitted within the plane defined by said front frame member to an open position wherein said supports outwardly project therefrom in spaced relation to each other, said cover formed of generally flexible material and open at one end, said cover attached to said front frame member at said one end thereof and adapted for expansion from a closed, generally folded position to an expanded open position wherein portions thereof are supported by said support members, and means for maintaining said support members in said open position.

2. The construction of claim 1 wherein said cover includes top, bottom, end and opposed side wall panels, said support members contacting marginal portions of said side wall panels in said open position.

3. The construction of claim 1, wherein said support members comprise generally open-ended U-shaped frames each having top, bottom and connecting end portions, said support members connected at said open ends thereof to said front frame member.

4. The construction of claim 3, each said support member being a continuous shaped hollow tube, the terminal open-ended portions of said tubes connected to said frame by means of a pivot pin projecting through both said frame and said tube.

5. The construction of claim 3, wherein the top portions of said support members slope downwardly toward the end portions thereof so that the top of the cover supported thereby slopes downwardly to the rear in said open position thereof.

6. The construction of claim 3, said front frame member being of generally rectangular configuration and having opposed top and bottom sections and opposed side sections, said bottom portions of said support members adapted to contact said bottom frame section for support thereby in said closed storage position.

7. The construction of claim 6, wherein said front frame member includes inner and outer marginal flanges, said outer flange having portions adapted to contact at least upper and lower window frame portions so as to retain said enclosure within a window opening, and said inner flange having portions to prevent said support members from passing through the plane of said front frame forward thereof.

8. The construction of claim 7, said side sections of said front frame member having portions adapted for lateral movement to contact side portions of said supporting window frame.

9. The construction of claim 3, wherein said means for maintaining said support members in said open position comprises a tray having a closed bottom and opposed side flanges, each of said flanges supported by a respective bottom portion of said support members.

10. The construction of claim 6, wherein each connecting support end portion and each front frame member side section cooperatively include means for mounting a shelf at various spaced positions within said enclosure.

11. The construction of claim 10, wherein said shelf supporting means comprises a plurality of openings in each of said support end portions and a plurality of notches within said front frame member side sections, said openings and notches on respective sides of said enclosure adapted to support a pair of opposed rods in turn adapted to support said shelf.

12. The construction of claim 11, wherein said shelf includes a plurality of openings therethrough.

13. The construction of claim 1, wherein said cover is of a translucent plastic material.

* * * * *